O. E. MICHAUD.
ROLLER BEARING.
APPLICATION FILED SEPT. 22, 1919.

1,397,226.

Patented Nov. 15, 1921.

Inventor:
Onesime E. Michaud,
by Cameron & Cameron,
his Attys.

UNITED STATES PATENT OFFICE.

ONESIME E. MICHAUD, OF ST. LOUIS, MISSOURI.

ROLLER-BEARING.

1,397,226.   Specification of Letters Patent.   Patented Nov. 15, 1921.

Application filed September 22, 1919. Serial No. 325,357.

*To all whom it may concern:*

Be it known that I, ONESIME E. MICHAUD, a citizen of the United States, and a resident of the city of St. Louis and State of Missouri, have invented a new and useful Improvement in Roller-Bearings, of which the following is a specification.

This invention relates to antifriction bearings of the roller type, and particularly to the roller spacing cage and the means for holding said cage and rollers in position on the bearing ring.

The objects of the invention are; a smoothly running bearing; increased strength coupled with the saving of metal; reduced cost of manufacture; simplicity of construction; and ready assembling of the bearing parts.

The invention consists in the combination of an antifriction bearing comprising antifriction bearing members arranged around a raceway or bearing ring, with a spacing member or cage for maintaining the antifriction bearing members in parallel alinement and at an equidistant spacing around the bearing ring, and a retaining or locking ring for holding the bearing members in assembled position on the bearing ring. The invention also consists in the cage, and in the parts, and in the arrangements of parts, hereinafter described and claimed.

In the accompanying drawing, wherein like symbols refer to like parts wherever they occur, Figure 1 is an end view of a bearing, showing a cage and locking ring embodying my invention assembled with the rollers around an inner bearing ring;

Figure 1:
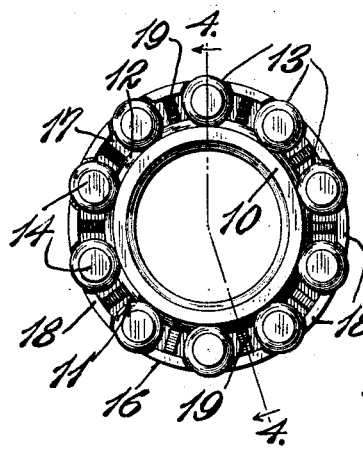
Figure 2:
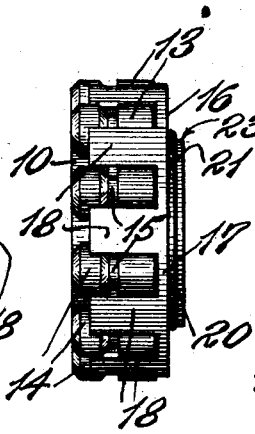
Fig. 2 is a side elevation of the assembled bearing.
Figure 3:
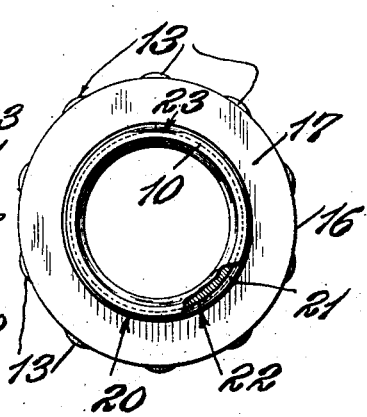
Fig. 3 is an end view of the bearing opposite to the end shown in Fig. 1.
Figure 4:
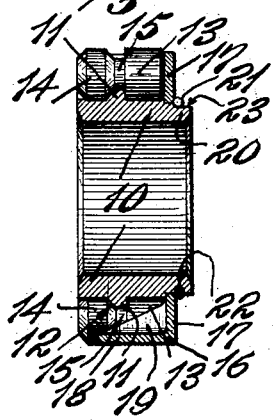
Fig. 4 is an axial section of the bearing, the section being taken on the line 4—4 in Fig. 1.
Figures 5, 6:
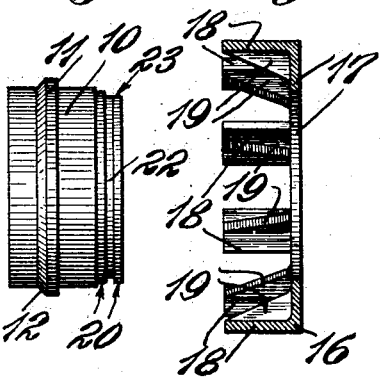
Fig. 5 is a side elevation of the inner bearing member.
Fig. 6 is an axial section of the spacing member or cage, the section being taken through the roller spacing members or tongues.

The inner bearing ring 10 shown in Figs. 1 to 7 in the accompanying drawings has an exterior circumferential rib or flange 11, one side 12 of which is beveled. Cylindrical bearing rollers 13 are arranged in a circular series around the inner bearing member 10 and comprise main bearing portions and head portions 14 connected by reduced neck portions 15. The inner circumferential edges of the head portions 14 of the bearing roller 13 are beveled to coöperate with the beveled side 12 of the rib 11 of the inner bearing ring 10. The outer edges of the bearing rollers 13 are also beveled to coöperate with a beveled face or flange of an outer bearing ring (not shown).

Rollers 13 are spaced apart and held against outward radial movement with respect to the inner bearing member by means of a spacing member or roller retaining cage 16, which comprises an annular plate portion 17 having a series of spacing members or tongues 18 adapted to hold the rollers 13 in position on the inner bearing ring 10. The tongues 18 of the roller cage are located at regular intervals around the outer marginal portion of the annular portion 17 thereof and project from the inner face of the annular portion parallel with the axis of the bearing. The tongues 18 of the cage extend between the rollers 13 and hold them apart, and their sides are undercut to correspond to the cylindrical surfaces of the rollers. The tongues 18 are spaced far enough apart to permit the rollers 13 to fit loosely therebetween, but the spaces between the tongues are less than the width of the rollers, thus holding the rollers against outward radial movement from the inner bearing ring 10 and also holding them in spaced parallel alinement. The roller cage 16 is preferably made in the form of a forging, and at the angle between the tongues 18 and the annular portion 17 the tongues are strengthened by means of triangular shaped ribs 19.

The end portion of the inner bearing ring 10, adjacent to the ends of the main bearing portions of the bearing rollers 13, is reduced at 20, forming an annular stop shoulder against which the annular portion 17 of the roller cage 16 bears and limits the distance to which the cage can be moved toward the head portions 14 of the bearing rollers 13.

This prevents the main bearing portion of the bearing rollers from being clamped between the inner face of the annular portion 17 of the roller spacing cage 16 and the beveled annular rib 11 of the inner bearing ring 10. The annular portion 17 of the roller cage is held against the shouldered portion of the inner bearing ring 10 by means of a locking member, which is shown in the form of a split ring 21 (see Fig. 7). This split ring rests in a shallow annular groove 22 formed in the reduced end portion 20 of the inner bearing ring and bears against the annular portion 17 of the roller cage 16, thus preventing endwise movement of the roller cage in the direction of the split ring 21. This split ring is preferably snapped in place, and the end of the inner bearing ring is shown cut away as at 23 (see Fig. 3) to allow a sharp pointed instrument to be inserted beneath the ends of the split ring to permit the ring to be removed, thus allowing the bearing to be disassembled.

Figure 7:
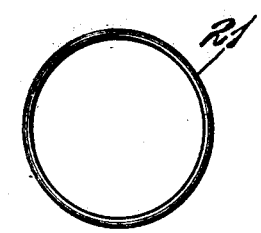
Fig. 7 is a side of the split locking ring.
Figure 8:
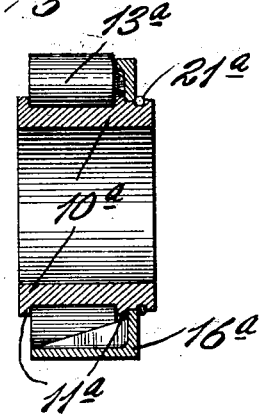
Fig. 8 is an axial section similar to Fig. 4, showing the roller cage and locking ring applied to a bearing having straight bearing rollers.

In the modified form of bearing shown in Fig. 8 of the drawing, the inner bearing ring 10$^a$ is provided with spaced annular ribs 11$^a$ forming a raceway for plain cylindrical rollers 13$^a$. The inner bearing ring in other respects is identical with the ring 10 previously described, having a reduced end which forms a stop shoulder for the roller cage 16$^a$ and the locking ring 21$^a$ like that shown in Fig. 7 is shown seated in a groove for holding the roller cage in position.

Figure 9:
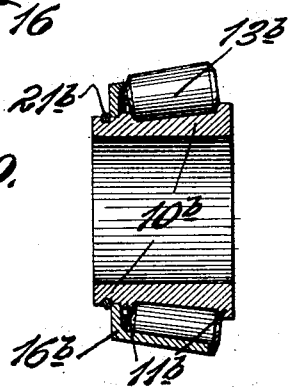
Fig. 9 is a similar view showing the roller cage and bearing ring in connection with a bearing having tapered bearing rollers.

In the modification shown in Fig. 9, bearing rollers 13$^b$ are shown tapered and the exterior surface of the inner bearing ring 10$^b$ is provided with spaced annular ribs 11$^b$, forming a raceway for the rollers. The cage 16$^b$ is shown with its spacing members or tongues converging to conform to the taper of the rollers, and a locking ring 21$^b$ rests in the groove and holds the roller cage against the stop shoulder in the same manner as that shown in the two previously described bearings.

The accompanying drawings illustrate a preferred form of the invention, but I do not wish to be limited to the types of rollers shown as the invention is also applicable to bearings having ball bearing members.

What I claim is:

1. In a roller bearing, the combination of a bearing ring, a series of bearing rollers coöperating with one surface of said bearing ring, said surface having an annular rib adjacent to one end of said rollers adapted to coöperate with said rollers to limit endwise movement thereof in its direction, a roller retaining cage for holding said bearing rollers against radial movement away from the bearing ring, and means removably mounted on said bearing ring adjacent to the opposite ends of said rollers, said means being disposed outside of the adjacent end portion of said cage and being adapted to coöperate with said cage to limit endwise movement thereof in its direction.

2. In a roller bearing, the combination of an inner bearing ring having spaced circumferential ribs on its exterior surface forming a raceway, bearing rollers arranged in said raceway, a roller retaining cage adapted to maintain said rollers in spaced parallel relation and for holding said rollers against outward radial movement from the raceway, said roller retaining cage comprising an annular portion adapted to bear against the outer side of one of the circumferential ribs of said bearing ring and being provided with tongues extending between said rollers, and means removably mounted on said inner bearing ring and adapted to engage the annular portion of said retaining member for holding said member in position.

3. In a roller bearing, the combination of an inner bearing ring having spaced circumferential ribs on its exterior surface forming a raceway, bearing rollers arranged in said raceway, a roller retaining cage to maintain said rollers in spaced parallel relation and for holding said rollers against outward radial movement from the raceway, said roller retaining cage comprising an annular portion adapted to bear against the outer side of one of the circumferential ribs of said bearing ring and being provided with tongues extending between said rollers, said roller cage having strengthening ribs connecting the annular portion and each of said tongues, and a split ring removably secured to said bearing ring and adapted to engage the annular portion of said retaining member for holding said member in position.

4. In a roller bearing, the combination of an inner roller bearing ring having spaced circumferential ribs forming a roller raceway, said bearing ring having an annular groove formed therein arranged outside of said roller raceway adjacent to one of said circumferential ribs, bearing rollers arranged in said roller raceway, a roller cage comprising an annular portion located between one of the circumferential ribs of said bearing and the annular groove adjacent thereto having tongues extending between said rollers for retaining said rollers against outward radial movement with respect to the raceway and for maintaining said rollers in spaced parallel relation, and a split ring adapted to be snapped into the annular groove of said bearing ring for locking the annular portion of said retaining member between said annular groove and the adjacent circumferential rib of said bearing member.

5. In a roller bearing, the combination of an inner bearing ring having an exterior circumferential rib, bearing rollers coöperating with the exterior surfaces of said bearing ring, each of said bearing rollers comprising a main bearing portion and a head portion connected by a reduced neck portion which is positioned over said rib, a retaining member comprising an annular portion located at one end of said bearing rollers and having tongues extending between the bearing rollers, and means removably mounted on said bearing ring and adapted to engage the annular portion of said retaining member for holding said member in position.

6. In a roller bearing, the combination of an inner bearing ring having an exterior circumferential rib and a reduced end portion forming an annular shoulder, bearing rollers coöperating with the exterior surface of said bearing ring, each of said bearing rollers comprising a main bearing portion and a head portion connected by a reduced neck portion which is positioned over said rib, a rigid retaining member comprising an annular portion adapted to bear against the annular shoulder at the reduced end of said bearing ring and having spaced tongues extending between the bearing rollers, and means removably mounted on the reduced end of said bearing ring and adapted to engage the annular portion of said retaining member for holding said member in position.

7. In a roller bearing, the combination of an inner bearing ring having an exterior circumferential rib, said bearing ring having a reduced end portion forming a stop shoulder and having an annular groove located in said reduced portion adjacent to said stop shoulder, bearing rollers coöperating with the exterior surface of said bearing ring, each of said bearing rollers comprising a main bearing portion and a head portion connected by a reduced neck portion which is positioned over said circumferential rib, a forged retaining member comprising an annular portion mounted on the reduced end portion of said bearing ring between the circumferential rib and the annular groove of said bearing ring and having tongues extending between the bearing rollers, and a split ring adapted to be snapped into the groove in the reduced end portion of said bearing ring for holding said retaining member in position.

8. In a roller bearing, the combination of an inner bearing ring having an exterior circumferential rib and a reduced end portion forming an annular shoulder, bearing rollers coöperating with the exterior surface of said bearing ring, each of said bearing rollers having a reduced neck portion positioned over said rib, a retaining member comprising an annular portion located at one end of said rollers and adapted to bear against the annular shoulder of said bearing ring and having tongues extending between the bearing rollers, and a split ring removably mounted on the reduced end portion of said bearing and adapted to engage the annular portion of said retaining member for holding said member in position.

9. A forged retaining member for roller bearings comprising an annular portion having a series of integral spacing tongues located at its outer edge, said tongues projecting from one face of said annular portion parallel with the axis of said bearing, said retaining member being provided with strengthening ribs at the angle between the tongues and the annular portion of said retaining member, said strengthening rib being integral with said annular portion and said spacing tongues.

Signed at St. Louis, Missouri, this 19th day of September, 1919.

ONESIME E. MICHAUD.